United States Patent
Stewart

(10) Patent No.: US 9,334,038 B2
(45) Date of Patent: May 10, 2016

(54) APPARATUS FOR ATTACHMENT OF WING PANELS

(71) Applicant: AIRBUS OPERATIONS LIMITED, Bristol (GB)

(72) Inventor: David Mark Stewart, Bristol (GB)

(73) Assignee: Airbus Operations Limited, Bristol (GB)

( * ) Notice: Subject to any disclaimer, the term of this patent is extended or adjusted under 35 U.S.C. 154(b) by 4 days.

(21) Appl. No.: 13/688,475

(22) Filed: Nov. 29, 2012

(65) Prior Publication Data

US 2013/0146712 A1    Jun. 13, 2013

(30) Foreign Application Priority Data

Dec. 7, 2011    (GB) .................................. 1120996.2

(51) Int. Cl.
*B64C 1/06*    (2006.01)
*B64C 1/00*    (2006.01)
*B64C 3/28*    (2006.01)

(52) U.S. Cl.
CPC .... *B64C 1/00* (2013.01); *B64C 3/28* (2013.01)

(58) Field of Classification Search
CPC .............. B64C 3/28; B64C 3/26; B64C 1/12; B64C 1/26; B64C 9/02
USPC ......... 244/131, 213, 214, 132; 29/428; 3/131, 3/213, 214
See application file for complete search history.

(56) References Cited

U.S. PATENT DOCUMENTS

| | | | |
|---|---|---|---|
| 4,055,041 A * | 10/1977 | Adamson et al. ............ 60/226.1 |
| 8,070,100 B2 * | 12/2011 | Douglas ..................... 244/123.1 |
| 8,376,278 B2 * | 2/2013 | Stewart ...................... 244/123.1 |
| 2009/0218442 A1 | 9/2009 | McAlinden et al. |
| 2009/0218446 A1 * | 9/2009 | McAlinden et al. ......... 244/131 |
| 2009/0218450 A1 | 9/2009 | McAlinden et al. |
| 2010/0065687 A1 * | 3/2010 | Douglas ........................ 244/130 |
| 2010/0320316 A1 * | 12/2010 | Vauchel et al. ............... 244/1 N |
| 2011/0095133 A1 * | 4/2011 | Stewart ...................... 244/123.1 |
| 2011/0233338 A1 * | 9/2011 | Stewart .......................... 244/131 |
| 2011/0271509 A1 * | 11/2011 | Willdig et al. .................. 29/428 |

FOREIGN PATENT DOCUMENTS

| | | |
|---|---|---|
| EP | 2 266 877 | 12/2010 |
| GB | 2 013 593 | 8/1979 |
| WO | WO 2006/067403 | 6/2006 |
| WO | WO 2010/116168 | 10/2010 |

OTHER PUBLICATIONS

Extended European Search Report dated Mar. 19, 2013 in EP 12194697.4-1754.
Search Report for UK1120996.2, dated Apr. 2, 2012.

* cited by examiner

*Primary Examiner* — Philip J Bonzell
(74) *Attorney, Agent, or Firm* — Nixon & Vanderhye P.C.

(57) ABSTRACT

A shroud panel (60) is attached to a wing skin overhang (28) by a series of pivoting butt straps (86) to permit relative strains to occur.

17 Claims, 3 Drawing Sheets

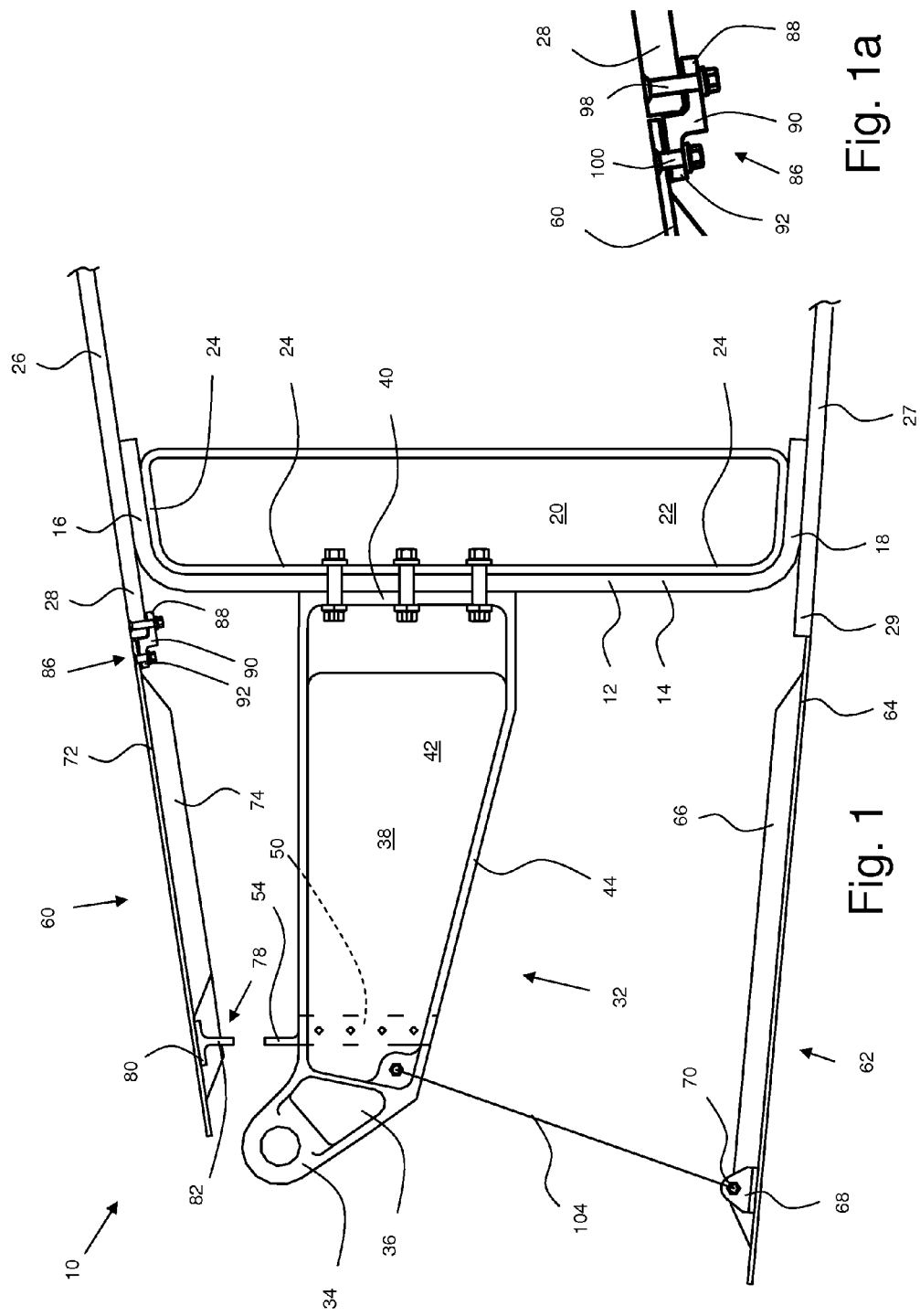

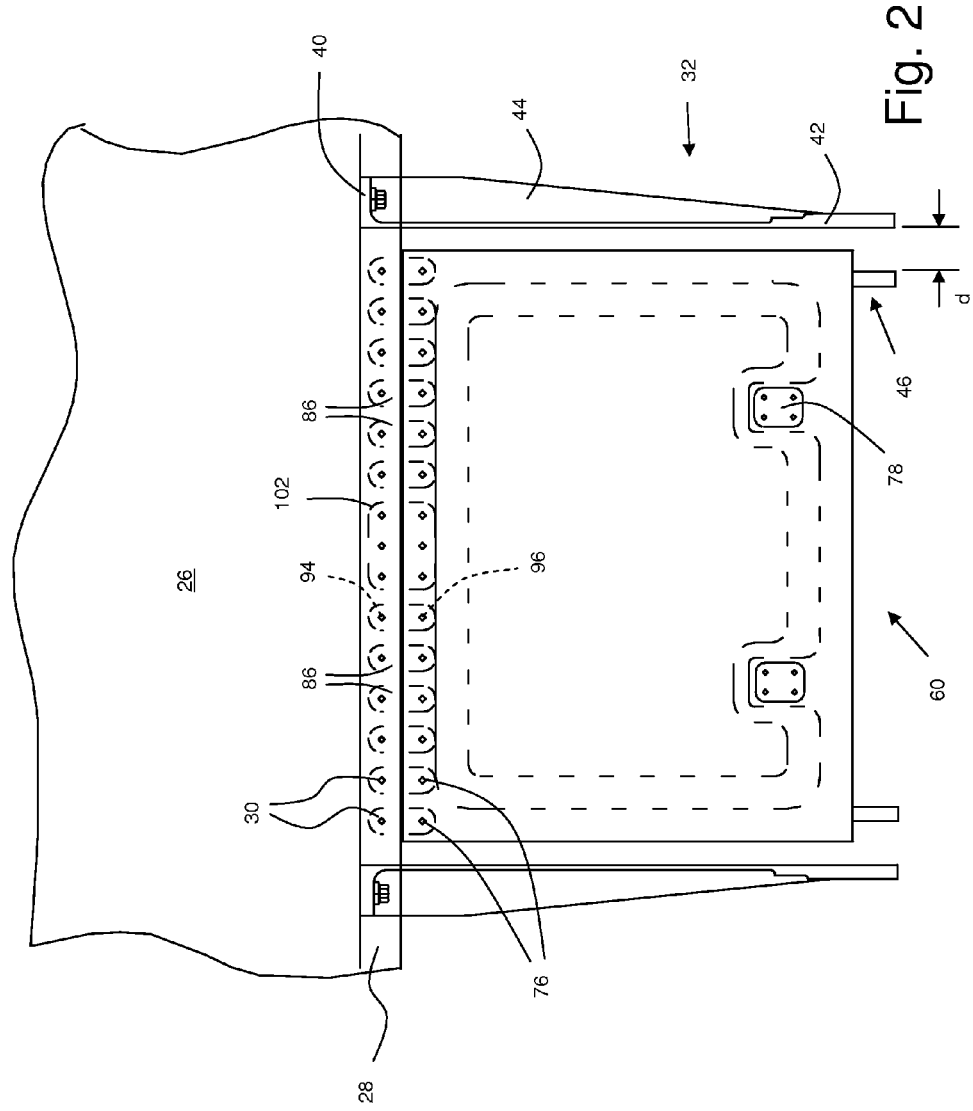

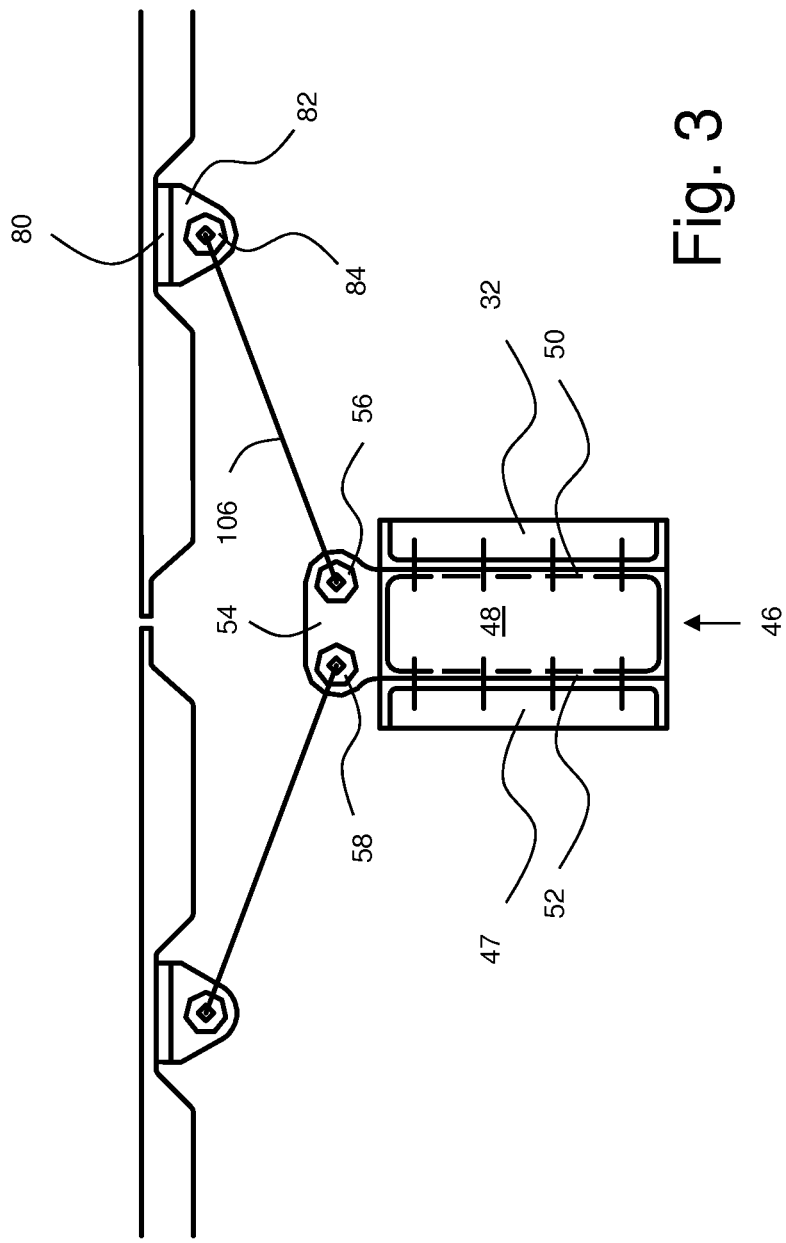

APPARATUS FOR ATTACHMENT OF WING PANELS

This application claims priority to UK Patent Application No. 1120996.2 filed 7 Dec. 2011, the entire content of which is hereby incorporated by reference.

BACKGROUND OF INVENTION

The present invention is concerned with apparatus for attachment of panels to aircraft aerodynamic structures. More specifically, the present invention is concerned with an apparatus for attaching shroud panels to the trailing edge of aircraft wing covers.

Known aircraft aerodynamic structures such as wings and stabilisers comprise a rear spar, abutted on its top and bottom surfaces by upper and lower skins or covers. In order to provide a smooth aerodynamic surface rearward of the spar, wings and stabilisers are provided with shroud panels, which extend rearward of the spar and act as a continuation of the skins.

A problem in the attachment of such shroud panels at the trailing edge of wings and stabilisers is that strains experienced in flight differ between the wing or stabiliser and the shroud panel. Such strain differentials can cause excessive stresses to develop, requiring frequent service checks and component replacement and/or repair.

As a result, existing attachment schemes between the shroud panels and the aerodynamic structure are quite bulky in order to handle the stresses imparted thereon. This increases the weight and cost of the aircraft.

SUMMARY OF INVENTION

It is an aim of the present invention to overcome, or at least mitigate this problem.

According to a first aspect of the present invention there is provided an aircraft fixed aerodynamic structure assembly comprising:
a fixed aerodynamic structure component,
a shroud panel,
in which the shroud panel is attached to the fixed aerodynamic structure component by a plurality of attachment members, each attachment member being connected to at least one of the shroud panel and the fixed aerodynamic structure component by an articulated joint.

According to a second aspect of the present invention there is provided an aircraft shroud assembly comprising:
a shroud panel,
a plurality of attachment members extending from an edge of the shroud panel in use, each attachment member being connected to the shroud panel via an articulated joint.

By "aircraft fixed aerodynamic structure" we mean a structure of the aircraft attached to the fuselage which controls or influences flight, such as an aircraft wing, vertical stabiliser or horizontal stabiliser.

Preferably, the attachment members pivot at one or both ends, and are provided as pivoting butt straps.

Advantageously, the provision of such pivoting butt straps allows relative movement between adjacent locations on the shroud panel and wing or stabiliser. Therefore the stresses produced in both parts by any strain differential resulting from thermal or force effects are reduced.

Preferably the attachment members are pivotably connected to both the shroud panel and aerodynamic structure component.

Preferably at least one of the butt straps has a range of motion limited by an abutment with the shroud panel or the wing trailing edge component. This may be defined by a shoulder formed in the butt strap, which may also act to keep the outer wing surface flush.

Preferably h the shroud panel and the wing trailing edge component are also attached by a non-pivotable butt strap, being rotationally fixed to the shroud panel and trailing edge component. This takes any side load, whilst allowing relative expansion/contraction.

Preferably the non-pivotable butt strap is located in substantially the spanwise centre of the shroud panel. A plurality of pivotable putt straps may be provided on either spanwise side of the non-pivotable butt strap.

Preferably a spoiler rib extending from the trailing edge of the wing, which spoiler rib is connected to the shroud panel at a trailing edge thereof.

Preferably the spoiler rib and shroud panel are connected by a strut, which strut extends in a vertical spanwise plane in use.

SUMMARY OF DRAWINGS

An apparatus in accordance with the present invention will now be described with reference to the accompanying drawings in which:

FIG. 1 is a side view of a wing trailing edge comprising an apparatus according to the present invention, FIG. 1a is a detail view of region A of the apparatus of FIG. 1, FIG. 2 is a top view of the trailing edge comprising the apparatus of FIG. 1, and, FIG. 3 is a rear view of a part of the apparatus of FIG. 1.

DETAILED DESCRIPTION

Directional terms such as "forward" and "rearward" denote the direction applicable when the wing is in flight.

A wing trailing edge assembly 10 comprises a rear spar 12 which runs in a spanwise direction along the wing. The rear spar comprises a vertical plate 14 and two forwardly depending flanges 16, 18 at the top and bottom thereof. The flanges 16, 18 are tapered slightly to diverge in a forward direction. The rear spar 12 therefore defines a forward facing concavity.

A stiffener 20 is provided against the forward facing side of the spar 12. The stiffener 20 comprises a main plate 22 extending vertically and in a chordwise direction. A peripheral flange 24 runs around the edge of the main plate 22 giving it a cup-like shape. The plate 22 tapers outwardly in a forward direction and is nested within the concavity formed by the spar 12.

At the top surface of the spar 12, an upper wing skin 26 is provided which has a small overhang 28 over the rear of the spar 12. The overhang defines a number of bores 30 equally spaced in a spanwise direction (see FIG. 2).

A lower wing skin 27 extends over the lower part of the rib 12 in a similar manner, having an overhang 29.

A first spoiler rib 32 extends from the rear of the spar 12. The rib 32 defines a lug 34 at a first end which is connected to a dogleg portion 36 and then to a main beam 38. At the end of the main beam opposite the lug 34 an attachment portion 40 is defined whereby the rib 32 is bolted to the spar 12 and stiffener 20. A spoiler (not shown) is pivotably attached to the lug 34.

The rib 32 is generally constructed as a chordwise vertical plate 42 having a peripheral flange 44 extending in a spanwise direction for structural rigidity.

Turning to FIG. 2, it can be seen that as well as the first spoiler rib 32, a second spolier rib 46 is also provided. The second spoiler rib 46 is a mirror image of the first rib 32 and the plates 42 are offset by a distance d. The flanges 44 extend in opposite directions.

Turning to FIG. 3, a rib attachment plate 47 is provided extending between the ribs 32, 46. The rib attachment plate 47 has a vertical spanwise plate 48 having two side flanges 50, 52 which are bolted to the ribs 32, 46 respectively.

The plate 48 extends to a double pivot mount 54 defining a first bore 56 and a second bore 58.

Turning back to FIG. 1, an upper shroud panel 60, and lower shroud panel 62 are provided. Both shroud panels are attached to, and extend from the skin overhangs 28, 29 respectively.

The lower shroud panel comprises a plate like extension 64 of the wing skin 27 having stiffening ribs 66 defined thereon. Proximate the end opposite the wing skin overhang 29, the panel defines an attachment lug 68 defining a bore 70.

The upper shroud panel 60 also comprises a plate like extension 72 of the upper wing skin 26 having a number of stiffening ribs 74 defined thereon. At a first end of the panel 60, a row of bores 76 are defined, equally spaced in a spanwise direction. The locations of the bores 76 match those of the bores 30 on the upper wing skin overhang 28.

The upper shroud panel 60 further defines a first strut attachment bracket 78 proximate the trailing edge thereof. The bracket comprises a plate 80 attached to the shroud panel 60, and a downwardly depending vertical spanwise flange 82 defining a bore 84 (see FIG. 3).

In order to attach the upper shroud panel 60 to the upper wing skin overhang 28, a plurality of pivoting butt straps 86 are provided. Each butt strap 86 is obround in plan (as shown in FIG. 2) and comprises a first attachment region 88 connected to a second attachment region 92 via a shoulder or step 90. The attachment regions 88, 92 define respective bores 94, 96.

Turning to FIG. 1a, in an installed position, the first region 88 of each strap 86 is positioned such that the bore 94 aligns with one of the bores 30 on the wing skin overhang 28. A first fastener 98 is inserted in order to form a pivoting joint between the strap 86 and the overhang 28.

The second region 90 of each strap 86 is positioned such that the bore 96 aligns with one of the bores 76 on the shroud panel 60. A second fastener 100 is inserted in order to form a pivoting joint between the strap 86 and the shroud panel 60. The step in the straps 86 produced by the shoulder 90 accounts for the difference in thickness between the thick wing skin and the thinner shroud panel. By providing a step, the outer surfaces can be made flush.

As shown in FIG. 2, a plurality of straps 86 are used to attach the shroud panel 60 to the overhang 28.

In addition, a central butt strap 102 is provided which is similar to the pivoting butt straps 86, but comprises a row of three bores on each side. The central butt strap is positioned at the spanwise centre of the shroud panel 60 with pivoting straps 86 either side.

A lower strut 104 joins the attachment lug 68 of the lower shroud panel 62, via a pinned connection in the bore 70 to the main beam 38 of the rib 32, where it also pinned. The lower strut 104 extends in a fore-aft direction in a vertical chordwise plane.

An upper strut 106 is pin joined to the upper shroud panel 60 at the bore 84 and extends to the bore 56 of the double pivot mount 54. It will be noted that the strut 106 extends in a vertical spanwise plane as shown in FIG. 3.

In use, each of the pivoting butt straps 86 can pivot about either attachment in order to allow relative deformation (under thermal or mechanical stresses) between the skin overhang 28 and the shroud panel 60. The degree of permitted relative deformation is determined in part by the geometry of the shoulder 90. The central strap 102 ensures that spanwise load can be taken by the structure without significant relative movement between the panels.

For example, should a change in temperature cause the shroud panel to expand in a spanwise direction by a degree greater than the skin overhang, this will be permitted by outward pivoting of the shroud side of the pivotable butt straps away from the central butt strap.

The assembly as described above provides a stable structure for the reaction of the various forces experienced in flight. The ribs are arranged to support the shroud panels vertically (via the upper struts) whilst the panels support the ribs in a spanwise (lateral) sense though the struts. This functionality arises because the struts are angled in the vertical spanwise plane and in compression have both a vertical and horizontal (spanwise) load carry capacity.

Variations of the above embodiment fall within the scope of the present invention. For example, the pivoting but straps may be connected to any other suitable component, not just the wing skin overhang.

It will also be noted that the butt straps are simple components which are inexpensive and easily replaced, as well as providing multiple redundancy.

The rib may be any other kind of rib, not just a spoiler rib.

The invention claimed is:

1. An aircraft fixed aerodynamic structure assembly comprising:
    a fixed aerodynamic structure component;
    a shroud panel;
    attachment members interconnecting the shroud panel and the fixed aerodynamic structure component, each attachment member connected to at least one of the shroud panel and the fixed aerodynamic structure component by an articulated joint;
    where each of the articulated joints is a pivot joint rotatable about an axis normal to at least one of the shroud panel and the fixed aerodynamic structure, and
    a non-pivotable butt strap rotationally fixed to the at least one of the shroud panel and fixed aerodynamic structure component.

2. An aircraft fixed aerodynamic structure assembly according to claim 1, wherein the articulated joint is a plurality of articulated joints, and in which the attachment members are each connected to both the shroud panel and the fixed aerodynamic structure component by a respective one of the articulated joints.

3. An aircraft fixed aerodynamic structure assembly according to claim 2 in which the articulated joints are pivot joints normal to both the shroud panel and the fixed aerodynamic structure.

4. An aircraft fixed aerodynamic structure assembly according to claim 3 in which the attachment members comprise butt straps, each having a fixed aerodynamic structure component attachment formation at a first end and a shroud panel attachment formation at a second end.

5. An aircraft fixed aerodynamic structure assembly according to claim 4 in which at least one of the butt straps has a range of motion limited by an abutment with the shroud panel or the fixed aerodynamic structure component.

6. An aircraft fixed aerodynamic structure assembly according to claim 5 in which the abutment is defined by a shoulder formed in the butt strap.

7. An aircraft fixed aerodynamic structure assembly according to claim 1 in which the non-pivotable butt strap is located in substantially the spanwise centre of the shroud panel.

8. An aircraft fixed aerodynamic structure assembly according to claim 7 in which a plurality of the attachment members are provided on either spanwise side of the non-pivotable butt strap.

9. An aircraft fixed aerodynamic structure assembly according to claim 1 which the fixed aerodynamic structure component is a wing or stabiliser cover or skin panel projecting from a trailing or leading edge of the wing or stabiliser.

10. An aircraft fixed aerodynamic structure assembly according to claim 9 comprising a spoiler rib extending from the trailing edge of the wing or stabiliser, which spoiler rib is connected to the shroud panel at a trailing edge thereof.

11. An aircraft fixed aerodynamic structure assembly according to claim 10 in which the spoiler rib and shroud panel are connected by a strut.

12. An aircraft fixed aerodynamic structure assembly according to claim 11 in which the strut extends in a vertical spanwise plane in use.

13. An aircraft shroud assembly comprising:
   a shroud panel;
   attachment members extending from an edge of the shroud panel, each attachment member connected to the shroud panel via an articulated joint, said articulated joint comprising a pivot joint rotatable about an axis normal to the shroud panel, and
   a non-pivotable butt strap for attachment to an aircraft wing, the non-pivotable butt strap being rotationally fixed to the shroud panel.

14. An aircraft shroud assembly according to claim 13 in which each of the attachment members defines a free end attachable to an aircraft wing, the free end defining a pivotable attachment formation rotatable about an axis normal to the aircraft wing.

15. An aircraft aerodynamic structure assembly comprising:
   a fixed aerodynamic structure;
   a shroud panel, and
   attachment members each connecting the shroud panel to the fixed aerodynamic structure, wherein the attachment members positioned along a length of the shroud panel and span a gap between the shroud panel and the fixed aerodynamic structure;
   the attachment members are each connected by a respective articulated joint to at least one of the shroud panel and the fixed aerodynamic structure, wherein the articulated joints are each a pivot joint rotatable about an axis normal to at least one of the shroud panel and the fixed aerodynamic structure;
   at least one center attachment butt strap at a center region of the length of the shroud panel, and spanning the gap, and
   the at least one center attachment butt strap is connected by a non-pivotable joint to at least one of the shroud panel and fixed aerodynamic structure component, and the non-pivotable joint precludes pivoting of the at least one center attachment member about an axis normal to at least one of the shroud panel and the fixed aerodynamic structure.

16. The aircraft aerodynamic structure assembly of claim 15 wherein each of the attachment members are each a butt-strap including a first end region attached to the shroud panel by a fastener having an axis normal to the shroud panel and a second end region attached to the fixed aerodynamic structure and having an axis normal to the fixed aerodynamic structure.

17. The aircraft aerodynamic structure assembly of claim 15 wherein the at least one center attachment butt strap includes a first end region attached to the shroud panel by fasteners offset from each other along a direction of the length of the shroud panel and a second end region attached to the fixed aerodynamic structure by fasteners offset from each other along the direction of the length of the shroud panel.

* * * * *